United States Patent [19]

Garcia

[11] Patent Number: 4,555,733
[45] Date of Patent: Nov. 26, 1985

[54] IMAGE ACQUISITION SYSTEM

[75] Inventor: Enrique Garcia, Sandy Hook, Conn.

[73] Assignee: The Perkin-Elmer Corporation, Norwalk, Conn.

[21] Appl. No.: 613,932

[22] Filed: May 25, 1984

[51] Int. Cl.$^4$ .............................................. H04N 1/04
[52] U.S. Cl. .................................... 358/293; 358/285; 358/212; 250/578
[58] Field of Search ............... 358/293, 285, 212, 213, 358/103, 109, 209, 256, 294; 250/578, 558

[56] References Cited

U.S. PATENT DOCUMENTS

| | | | |
|---|---|---|---|
| 4,323,925 | 4/1982 | Abell | 358/213 |
| 4,393,410 | 7/1982 | Ridge | 358/285 |
| 4,516,032 | 5/1985 | Barr | 250/578 |

Primary Examiner—Michael A. Masinick
Assistant Examiner—Paul A. Apffel
Attorney, Agent, or Firm—Thomas P. Murphy; Edwin T. Grimes; Francis L. Masselle

[57] ABSTRACT

The present invention is directed to a new and improved combination operative with an image acquisition system wherein a field-of-view is panned over a fixed image format; said combination comprising a sensor, an optical system for imaging the field-of-view at the sensor, said sensor including four linear arrays disposed in quadrilateral configuration, two of said arrays being applied to each half of a beam splitter cube; row and column buffers which are continuously updated every integration period, and a controller which strobes the buffers into a frame store memory after one resolution element width or pixel has been traversed.

7 Claims, 4 Drawing Figures

IMAGE ACQUISITION SYSTEM

FIELD OF INVENTION

This invention relates to image acquisition systems and, more particularly, to a system for accomplishing real-time acquisition of two dimensional images by employing one dimensional solid state imaging arrays.

BACKGROUND OF THE INVENTION

Many different types of two dimensional sensor arrays exist. The present invention is directed to improvements thereover, as will become apparent as the description proceeds.

In certain image acquisition systems, it is necessary to pan the field-of-view over a fixed image format. In such systems, new imagery enters the field-of-view along its edges and the old imagery is either dropped or displaced in a scrolling manner.

It is an object of the present invention to provide an image acquisition system which is suitable for such installations.

SUMMARY OF THE INVENTION

The present invention is directed to a new and improved combination of elements in an image acquisition system wherein a field-of-view is panned over a fixed image format. The combination includes sensor means, optical means for imaging the field-of-view at said sensor means, said sensor means including four linear arrays disposed in quadrilateral configuration. According to one aspect of the invention the four linear arrays disposed in quadrilateral configuration comprise two arrays applied to each half of a beam splitter cube. According to another aspect of the invention the combination further comprises row buffer means which are continually updated responsive to the output of the sensor means and column buffer means which are continuously updated responsive to the output of the sensor means, as well as memory means periodically updated responsive to the output of the row buffer means and the column buffer means.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as a basis for the designing of other systems for carrying out the several purposes of the invention. It is important, therefore, that this disclosure be regarded as including such equivalent systems as do not depart from the spirit and scope of the invention.

One embodiment of the invention has been chosen for purposes of illustration and description, and is shown in the accompanying drawings, forming a part of the specification.

DETAILED DESCRIPTION OF A PRESENTLY PREFERRED EMBODIMENT

Figure 1:
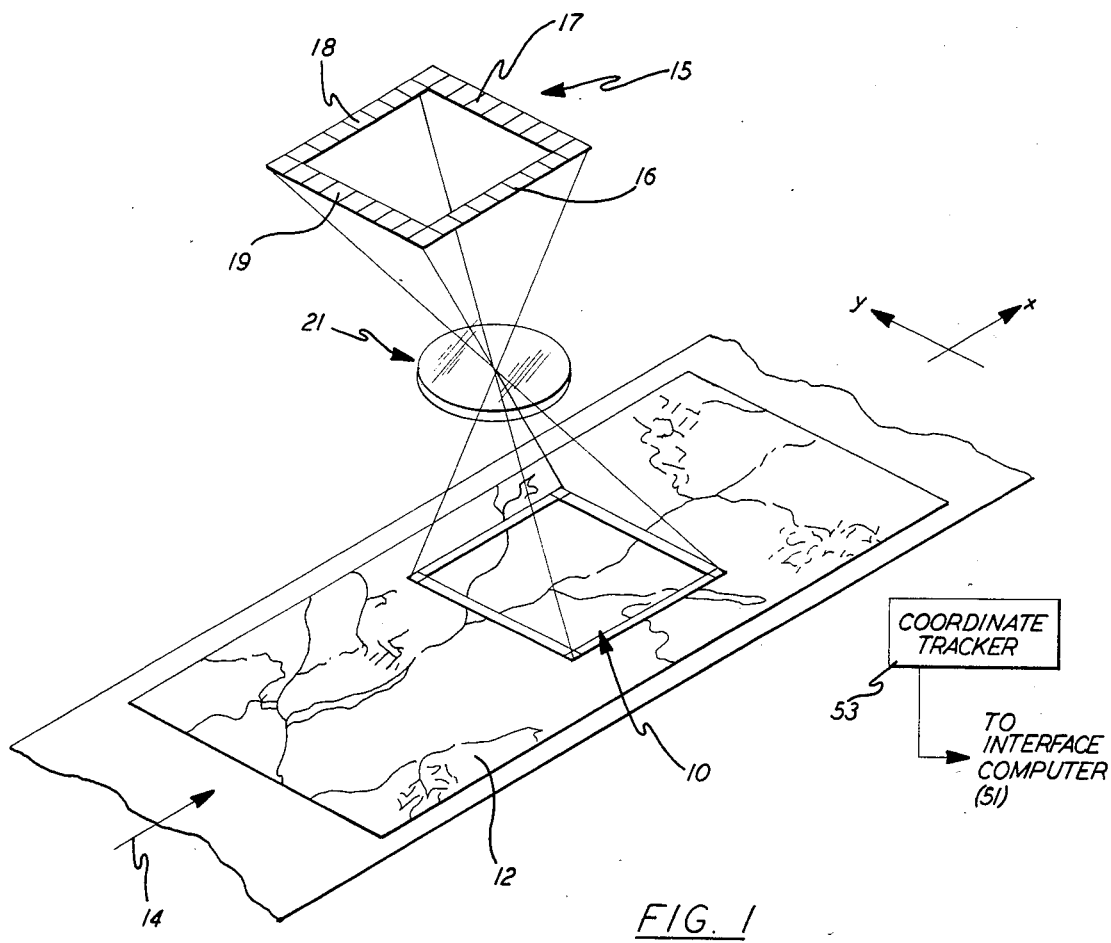
FIG. 1 is a perspective view of a four sensor scanner constructed according to the concepts of the present invention.

Referring to FIG. 1, the field-of-view, indicated generally at 10, is panned over a fixed image format. That is, a film 12 is moved as indicated by arrow 14 across the field-of-view 10. New imagery enters the field of view along its edges and the old imagery is either dropped or displaced in a scrolling manner. As a result, an image sensor indicated generally at 15 need only acquire new image data as it enters the field-of-view, and a data buffer representing the current field-of-view must be updated accordingly. With a single sensor configuration, if the panning direction changes by 90 degrees, for example, either the sensor must be rotated, which is undesirable, or else a second sensor orthogonal to the first must be actuated. It is also possible that the panning direction could abruptly change by 180 degrees. To avoid repositioning the sensor, a four-sensor configuration is used, which is indicated at 16, 17, 18 and 19 in FIG. 1. This sensor consists of four linear arrays in a quadrilateral configuration. The active array or arrays depends on the scan direction. The center of the square formed by the four sensors corresponds to the center of the field-of-view. As a result, new image data resulting from motion in any direction is acquired by a linear sensor already properly positioned. That is, the motion for panning the field-of-view necessary in any event and already inherently built into the system, accomplishes also the mechanical scan required by linear sensors.

Any suitable light source (not shown) may be provided for illumination of the film such as, for example, a remotely located light source that provides radiation which is suitably filtered and transferred to the film plane by means of a fiber light guide with a condenser lens at the output end.

Imaging optics symbolically indicated at 21, FIG. 1, serves to transfer an illuminated area on the film to the detector or sensor plane, as the film sweeps across the illuminated area. The imaging optics provide a continuous, preselected magnification, which can range from 1X to 5X, for example. The field-of-view dimensions vary with magnification. The imaging optics could be somewhat similar to that employed in stereomicroscopes.

Figure 2:
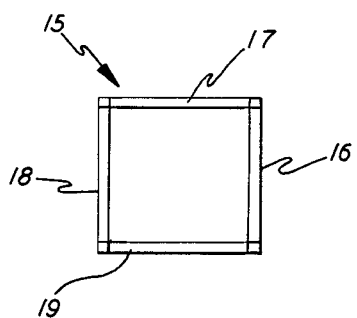
FIG. 2 is a view of a beam splitter cube sensor assembly, as seen from the lens of the sensor assembly.
Figure 3:
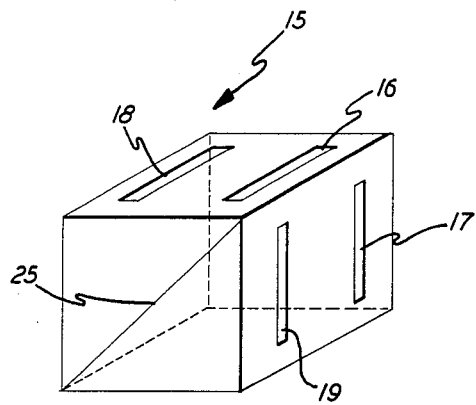
FIG. 3 is a perspective view of the beam splitter cube sensor assembly of FIG. 2.

Implementation of the sensor 15 in one form thereof is achieved by the use of a beam splitter cube, FIGS. 2 and 3. Referring to FIG. 2, the beam splitter cube at the focal plane permits the four individual linear arrays 16, 17, 18 and 19 to appear as a continuous array forming the perimeter of a square as seen from the optic system 21. The beam splitting surface is indicated at 25 in FIG. 3, and two arrays are cemented to each half of the cube. The optical efficiency is estimated at about 0.40 for each path.

In one form of the invention, each of the linear arrays 16, 17, 18, 19 at the focal plane of the scanner, has 2048 elements and a data rate of 6 MHz. A suitable sensor, for example, for this application is the Fairchild CCD-143.

Figure 4:
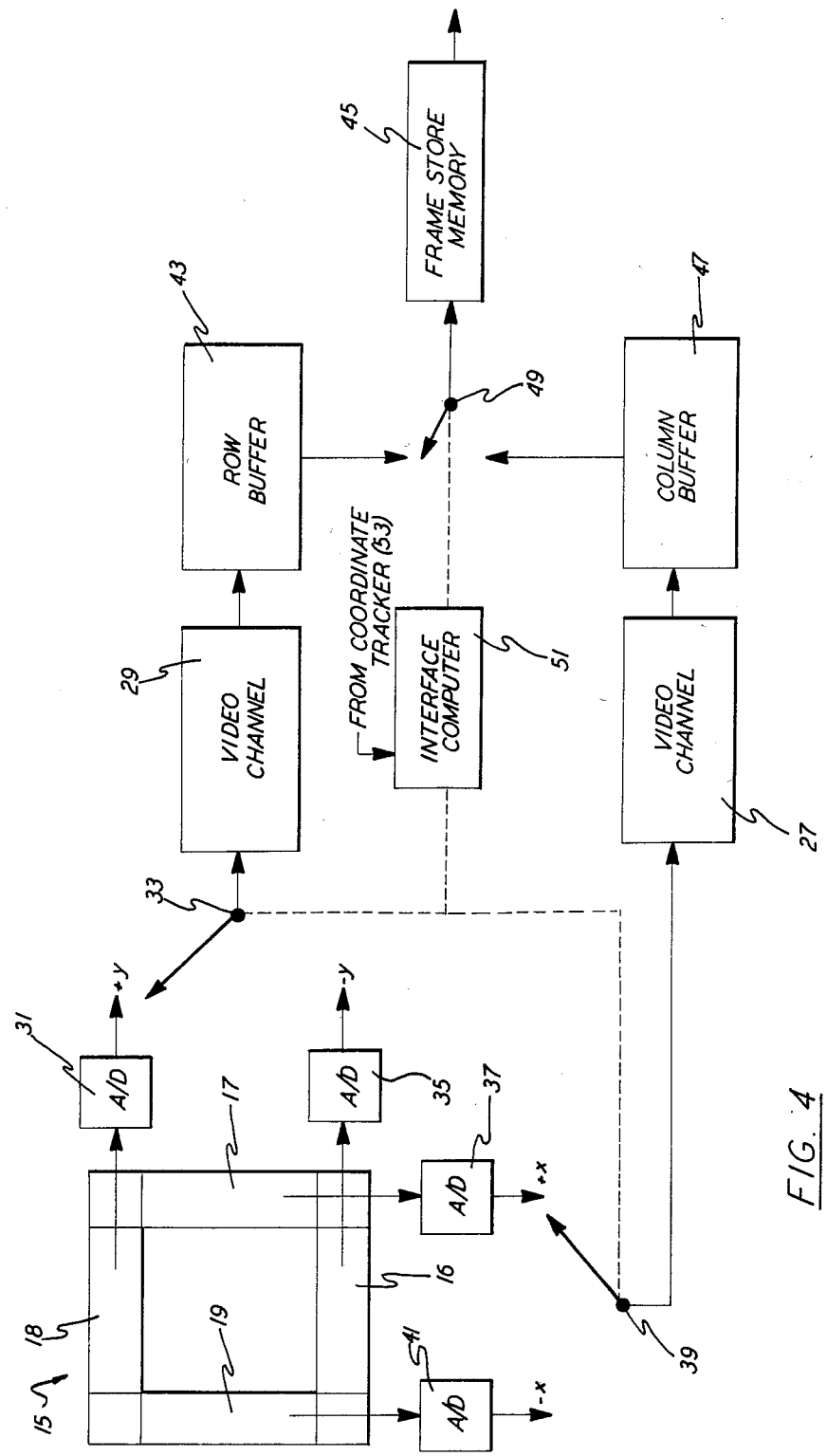
FIG. 4 is a block diagram of the image acquisition system according to the invention.

Although the above described imaging array contains four separate sensors, only two, at most, will be providing image data at any one time. Thus, only two video channels 27, 29 are required and the four sensors can be clocked identically at fixed, uninterrupted rates. A block diagram of the scanner is shown in FIG. 4. The output from the array 18 passes through an A/D converter 31 and through a switch 33 to the video channel 29. The output from the array 16 passes through an A/D converter 35, through the switch 33 and to the same video channel 29. The output from the array 17 passes through an A/D converter 37, through a switch 39 to the video channel 27. The output from the array 19 passes through an A/D converter 41, through the switch 39 to the video channel 27.

Row buffer 43 forms an interface between the video channel 29 and a frame store memory 45, and column buffer 47 forms an interface between the video channel 27 and the frame store memory 45. Switch 49 controls which one of the two buffers is connected to the memory 45. For example, in one form, each of the buffers comprises two 2048 by 8-bit sections with each section alternating between read and write mode. During any given integration period, the current row or column may be read out of one buffer section, while the next row and column is being written into the other buffer section. Thus, the row and column buffers are continually being updated every integration period with the current row and column. However, transfer of data into the frame store memory does not occur until a controller or interface computer 51 determines that the X-Y stage has traversed one resolution element width or one pixel and that new image data actually resides in the buffers. At that time the interface computer 51 strobes the buffers into the frame store memory and scrolls the old data already in it. The contents of the frame store memory at all times corresponds to the image data of the current field-of-view which is the area whose perimeter is defined by the four linear sensors.

The controller or interface computer 51 has three particular functions that it must control. The interface computer always tracks the coordinates of the field-of-view responsive to signals received from a coordinate tracker 53, FIG. 1. Depending on whether the direction of motion is plus or minus along the X and Y axes, multiplex logic in the computer will be directed to select via switches 33 and 39 two of the four serial data streams for further processing. The transfer of video data from the row and column buffers 43, 47 to the frame store memory 45 is also controlled by the interface computer via switch 49. The interface computer will conduct this transfer only when the sensor has moved by one pixel width in the X or Y direction. The interface computer 51 also controls various other conventional functions such as, for example, calibration cycles, dark current and gain corrections, etc.

It will thus be said that the present invention does indeed provide a new and improved image acquisition system, which uses linear sensor arrays in a novel optical and electronic arrangement, which permits a two dimensional image to be scanned in real-time in any arbitrary direction and at higher resolution than is possible with existing two dimensional sensor arrays. For the example discussed above, a 2048×2048 area array would be required to provide the same resolution and would have to be clocked at 2048×6 MHz=12.3 GHz to provide the same effective data rate.

Although a certain particular embodiment of the invention is herein disclosed for purposes of explanation, various modifications thereof, after study of this specification, will be apparent to those skilled in the art to which the invention pertains, and reference should accordingly be had to the appended claims in determining the scope of the invention.

What is claimed is:

1. In an image acquisition system wherein a field-of-view is panned over a fixed image format, the combination comprising:
sensor means;
optical means for imaging said field-of-view at said sensor means;
said sensor means including only four linear arrays disposed in quadrilateral configuration.

2. A system according to claim 1 wherein said four linear arrays disposed in quadrilateral configuration comprises two arrays applied to each half of a beam splitter cube.

3. A system according to claim 1 further comprising row buffer means which are continually updated responsive to the output of said sensor means;
column buffer means which are continuously updated responsive to the output of said sensor means
memory means periodically updated responsive to the output of said row buffer means and said column buffer means.

4. A system according to claim 1 wherein a first pair of said linear arrays acquires row image data and a second pair thereof acquires column image data;
said system further comprising:
row video channel means;
first switching means for connecting said row video channel means to one of said first pair of linear arrays;
column video channel means;
second switching means for connecting said column video channel means to one of said second pair of linear arrays;
row buffer means connected to said row video channel means;
column buffer means connected to said column video channel means;
memory means;
third switching means for connecting said memory means to said row buffer means or said column buffer means.

5. A system according to claim 4 further comprising coordinate tracking means for tracking the coordinates of said field-of-view; and
computer means for receiving the output from said coordinate tracker means;
said computer means controlling the operation of said first, second and third switching means.

6. A system according to claim 5 wherein said computer means strobes said buffers into the memory means when one resolution element width has traversed said fixed image format and the new image actually resides in said buffers.

7. A system according to claim 6 further comprising A/D converter means interposed between each of said linear arrays and its corresponding switching means.

* * * * *